Patented Oct. 31, 1933

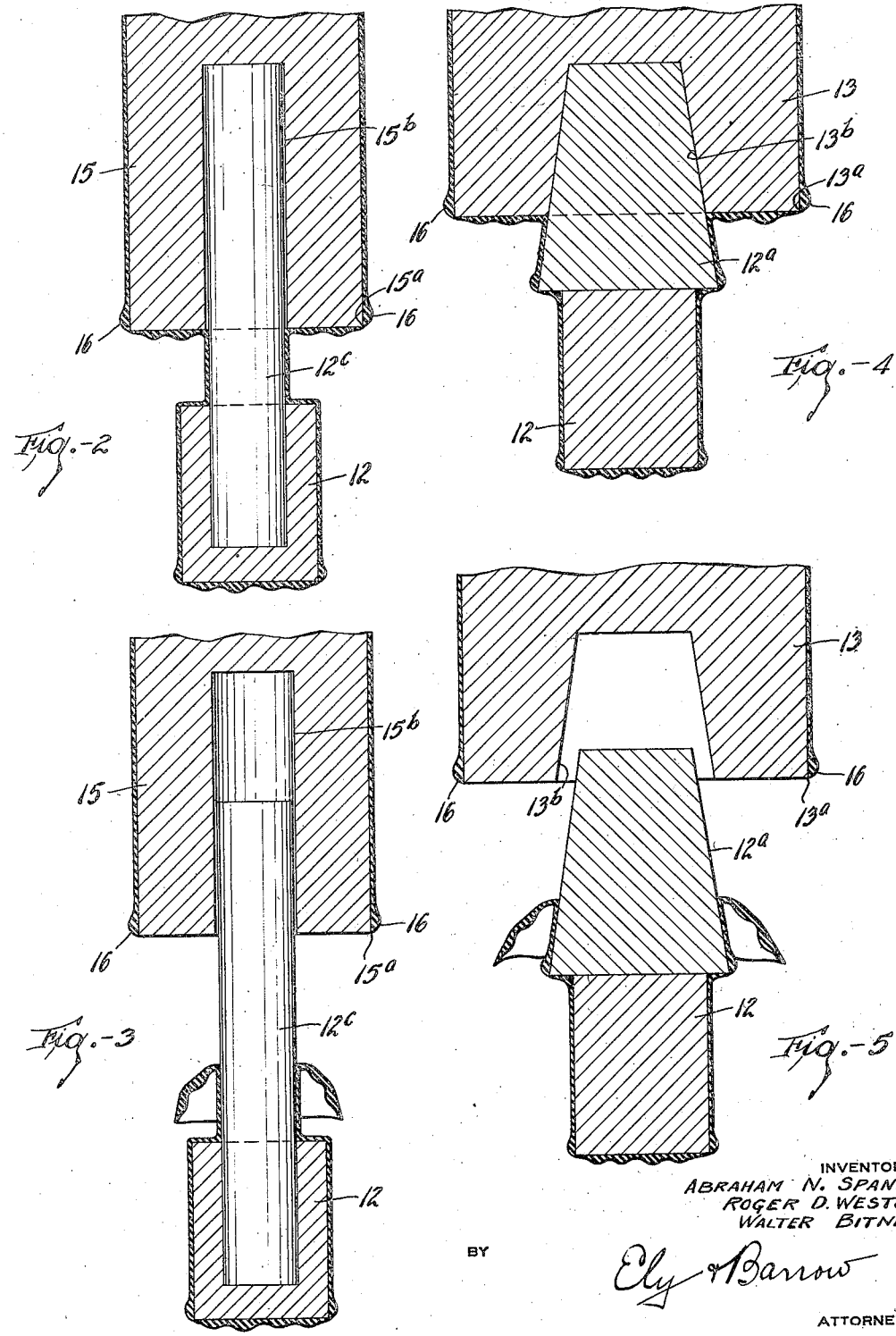

1,933,397

UNITED STATES PATENT OFFICE 1,933,397

METHOD AND APPARATUS FOR MAKING DIPPED RUBBER ARTICLES

Abraham N. Spanel, Roger D. Weston, and Walter Bitner, Rochester, N. Y., assignors to International Latex Corporation, Rochester, N. Y., a corporation of New York Application November 29, 1932
Serial No. 644,772

13 Claims. (Cl. 18—24)

This invention relates to procedure and apparatus for making dipped rubber goods of liquid latex.

One purpose of the invention is to provide an improved procedure for obtaining comparatively thick but uniform rubber articles of dipped rubber from liquid latex with a minimum number of dippings by simple dipping and drying operations.

Another purpose of the invention is to provide an improved procedure and apparatus for making such articles with a beaded or reinforced edge without a separate bead-rolling operation.

The foregoing and other purposes of the invention are attained by the method and apparatus illustrated in the accompanying drawings and described below. It is to be understood that the invention is not limited to the specific form thereof shown and described.

Of the accompanying drawings,

Figure 2 is an enlarged section on line 2—2 of Figure 1 after the dipping operation;

Figure 3 is a similar view showing the form being removed from the rack, which operation causes the rubber article to part from the rubber covering the bottom of the form and the rack leaving a reinforced edge on the article;

Figure 4 is a view similar to Figure 2 on line 4—4 of Figure 1; and

Figure 5 is a view similar to Figure 3 of the form of Figure 4 being separated from the rack.

Figure 1:
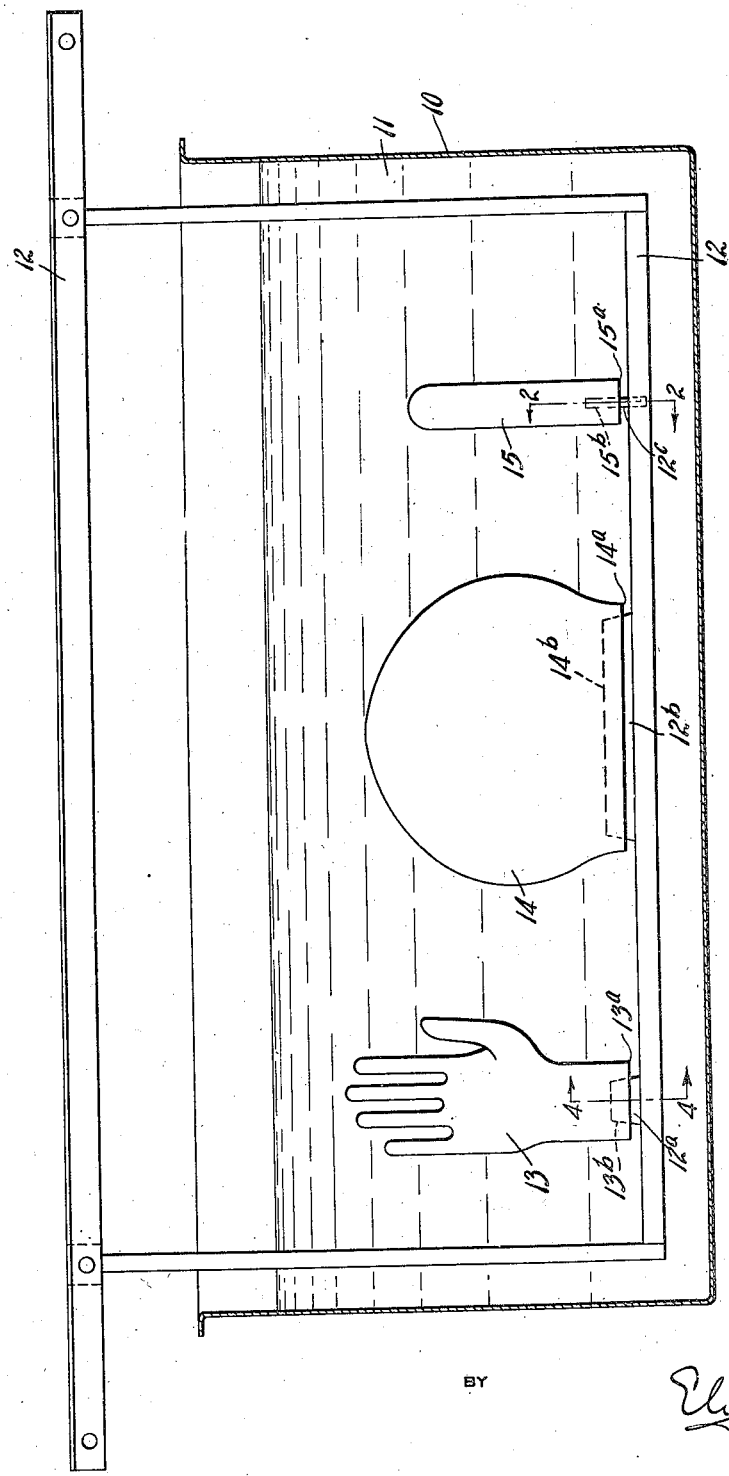
Figure 1 is a sectional view of a dipping tank with a rack carrying forms dipped therein in accordance with the invention.

In the manufacture of dipped articles of liquid latex without the use of a coagulant, applicant has discovered that by comparatively slow withdrawal of the forms from the dip-tank, a relatively thin coating of rubber is deposited on the form, this being due to the fact that the rubber in the film of latex is given time to drain into the fillet of latex about the form at the level of the latex, which fillet draws into the latex body all the rubber in excess of that adhering directly to and setting on the form, there being no considerable flow of latex over the form as it is withdrawn. The thin layer of latex thus produced may be quickly dried.

To produce comparatively thick rubber articles by depositing successive thin layers of latex on a form in this manner, however, is prohibitive in expense and moreover with articles of quite irregular shape such as rubber gloves, bathing caps, etc., an article of uniform thickness does not result.

It has been found that comparatively thick rubber articles of substantial uniformity and free from blisters may be produced by applying one or more inner layers of rubber to the forms by a comparatively slow withdrawal process with intermediate dryings and then applying one or more layers of rubber by a comparatively rapid withdrawal process. Certain articles may be made in accordance with the invention using only the rapid withdrawal process for all dippings, but the above-described slow and then fast withdrawal process is preferred.

Where the goods are to have beads or rings rolled upon the edges thereof the slow and then rapid withdrawal process applied respectively to the inner and outer dippings as described may be used without modification, the beads being rolled on the articles in the usual ways.

Many articles, however, may be formed with a heavy, reinforced edge without bead rolling, if the forms are provided with abrupt edges at the bottoms thereof above which the latex may gather or collect to provide a heavy or reinforced edge. When this operation is desired, the forms may be withdrawn at a comparatively rapid rate until the latex level is within a short distance from the bottom, at which time the withdrawal is either stopped entirely for a time interval and then proceeds slowly until the forms are completely withdrawn, or the forms are so slowed up when their bottoms are within a short distance from the latex level as to give the latex flowing down the form, as a result of the fast withdrawal, time to flow out onto the body of the latex to prevent the accumulation of too much latex at the bottom of the form which would produce unevenly-reinforced or beaded edges.

The effective use of a form with an abrupt or sharp lower edge to provide a reinforced edge to the article is possible because of the fact that the latex will collect above said edge and will deposit about said edge only as a very thin film capable of being easily severed at said edge.

When the reinforced or beaded edge is to be formed at an abrupt lower edge of the dipping form, the form is preferably removably mounted on a support engaged in an aperture or socket in the bottom of the form whereby upon lifting the form from the support, the tension of the rubber film over the support and bottom surface of the form will cause the deposited film to part at the abrupt lower edge of the form leaving on the form the deposited rubber article with a beaded or reinforced edge which may be subsequently vulcanized on the form and stripped therefrom without further bead-forming operations. However, if desired, the vulcanizing process may be carried out before the form is lifted from the support.

Referring to the drawings, the numeral 10 designates a dipping tank containing a body 11 of liquid latex and the numeral 12 designates a dipping rack upon which may be mounted forms such as the glove form 13, the bathing cap form 14, and the cot form 15. These forms are preferably provided with abrupt lower edges as indicated at 13$^a$, 14$^a$, and 15$^a$.

To carry out the invention in its preferred form, the forms 13, 14 and 15 are removably mounted on suitable supports on the rack 12 engaged in apertures or sockets in the bottom ends of the forms. For example, form 13 may have a wedge-shaped socket 13$^b$ therein to receive a wedge-shaped, upwardly-projecting piece 12$^a$ on rack 12; form 14 may have a wedge-shaped socket 14$^b$ in the bottom end thereof to receive upwardly-projecting wedge-shaped piece 12$^b$ on rack 12, and form 15 may have a socket 15$^b$ to receive an upwardly-projecting pin 12$^c$ on rack 12.

In the practice of the invention, the forms are dipped into the tank one or more times as illustrated in Figure 1 and withdrawn at a comparatively slow rate to deposit the inner layers of the article on the form. For a given article such as a bathing cap, this may be at the rate of ten inches per minute, with dryings intermediate each dipping. The outer layers of the articles are then deposited on the forms by one or more dippings with intermediate dryings by withdrawing the forms from the tank at a comparatively fast rate, in the case of the bathing cap, for example, at a rate of sixty to seventy inches per minute. However, the invention is not limited to the above-mentioned speeds of withdrawal.

When the usual bead-rolling operation is to be performed, the dipping of the outer layers may be accomplished by withdrawals at such high rates of speed without changing the rate of withdrawal adjacent the bottom of the forms and the forms need not necessarily be dipped in the positions shown nor need they be provided with abrupt lower edges, the beads being rolled thereon in any known manner.

When, however, it is desired to avoid the bead-rolling operation and to produce reinforced edges by the dipping operation, the forms will be in the positions shown and provided with abrupt lower bead-defining or reinforcement-defining edges. In such cases, the withdrawal of the forms is preferably stopped for an interval of time, say twenty to thirty seconds, a short distance, for example, a quarter to a half inch, from the bottom of the form and the withdrawal then proceeds slowly, for example, at the rate of ten inches per minute, until the form is completely withdrawn.

It may not be necessary to completely stop the withdrawal of the forms when their abrupt lower edges are within a short distance of the level of the latex but the speed thereof should be retarded until completely withdrawn to such a rate as will allow the latex flowing down the form to pass out into the latex body so that when the lower end of the form passes out of the latex there is no considerable flow of latex down the form causing the heavy portion of the deposited latex to become too large and uneven due to the weight thereof overcoming the surface tension of the film adhering to the form.

Satisfactory goods with such beaded or reinforced ends formed by dipping as described in the preceding paragraphs may be made using only the fast withdrawal process or only the slow withdrawal process for all dippings provided that in the case of the fast-withdrawal the withdrawal speed is controlled just before the bottoms of the forms pass out of the latex in the manner previously described. The better goods, more uniform and blister-free are produced, however, by using the slow withdrawal process at least for the first dipping.

After the goods have been dipped the required number of times and dried, the forms may be removed from the rack 12, or they may first be vulcanized and then removed. Where goods are provided with beaded edges by dipping using the abrupt-ended forms, the latex film will be coated on the form, its support and the rack as illustrated in Figures 2 and 4. Upon lifting the forms from their supports, the film of rubber at the abrupt or sharp edges of the forms will part due to the tenacity with which the rubber film adheres about the form supports and rack, leaving on the form the desired article with the desired beaded or reinforced edge, the rubber having collected above said edge to form said bead as indicated in Figures 2 to 5 at 16, 16.

It will be understood by skilled artisans that the rubber may be vulcanized in any suitable way either before or after depositing the same on a form to produce the article.

Modifications of the invention other than those disclosed herein may be resorted to without departing from the spirit thereof or the scope of the appended claims.

What is claimed is:—

1. That method for making dipped rubber articles of liquid latex which comprises dipping a form one or more times into a body of latex, withdrawing the form each time at a relatively slow rate such that the latex substantially sets on the form as the form is withdrawn to deposit a comparatively thin inner layer or layers of rubber on the form, and drying the film of rubber so deposited on the form after each dipping, then dipping the form one or more times in the latex, and withdrawing the form at a relatively fast rate to deposit a comparatively thick film or films of rubber on the form and drying the rubber on the form after each such dipping operation.

2. That method for making dipped rubber articles of liquid latex with reinforced or beaded edges comprising providing a form with an abrupt lower edge where the reinforced edge of the article is to be formed, removably supporting said form on a rack, dipping said rack and form into a body of latex one or more times and withdrawing the rack and form from the latex each time at a relatively slow rate to deposit a thin inner film or films on the form, drying after each such dipping operation, then dipping the rack and form one or more times and withdrawing the same each time at a relatively fast rate to deposit a comparatively thick film or films on the form, the withdrawal of the form just prior to passage of the lower end of the form from the latex being stopped for an interval of time or retarded and the withdrawal thereafter proceeding relatively more slowly to form a reinforced or beaded edge at the abrupt edge of the form, and drying after each such relatively fast dip.

3. That method for making dipped rubber articles of liquid latex with reinforced or beaded edges comprising providing a form with an abrupt lower edge where the reinforced edge of the article is to be formed, removably supporting said form on a rack, dipping said rack and form into a body of latex one or more times and withdrawing the rack and form from the latex each time at a relatively slow rate to deposit a thin inner film or films on the form, drying after each such dipping operation, then dipping the rack and form one or more times and withdrawing the same each time at a relatively fast rate to deposit a comparatively thick film or films on the form, the withdrawal of the form just prior to passage of the lower end of the form from the latex being stopped for an interval of time or retarded and the withdrawal thereafter proceeding relatively more slowly, drying each said thick film on the form after each such dipping, and removing the form from its support whereby the film of rubber parts at the abrupt edge of the form leaving the article with the reinforced edge on the form.

4. That method for making dipped rubber articles of liquid latex with reinforced or beaded edges comprising providing a form with an abrupt lower edge where the reinforced edge of the article is to be formed, removably supporting said form on a rack, dipping said rack and form into a body of latex one or more times and withdrawing the rack and form from the latex each time at a relatively slow rate whereby the latex deposited on the form substantially sets to deposit a thin film or films on the form, and removing the form from its support whereby the film of rubber parts at the lower edge of the form leaving the article with the reinforced edge on the form.

5. That method for making dipped rubber articles of liquid latex with reinforced or beaded edges comprising providing a form with an abrupt lower edge where the reinforced edge of the article is to be formed, removably supporting said form on a rack, dipping said rack and form into a body of latex one or more times and withdrawing the rack and form from the latex each time, and removing the form from its support whereby the film of rubber parts at the abrupt edge of the form leaving the article with the reinforced edge on the form.

6. That method for making dipped rubber articles of liquid latex with reinforced or beaded edges comprising providing a form with an abrupt lower edge where the reinforced edge of the article is to be formed, removably supporting said form on a rack having a projection engaged in an aperture or socket in the bottom of the form, dipping said rack and form into a body of latex one or more times and withdrawing the rack and form from the latex each time, and removing the form from its support whereby the film of rubber parts at the lower edge of the form leaving the article with the reinforced edge on the form.

7. Apparatus for making dipped rubber articles of liquid latex comprising a rack, a form having an abrupt lower edge, said form having one or more apertures or sockets in the bottom thereof and said rack having one or more upwardly directed projections engaging in said socket or sockets removably to support the form on the rack, and a tank for liquid latex into which said rack is movable to dip said form into said latex.

8. An apparatus for making dipped rubber articles from liquid latex comprising a rack, a form having an abrupt lower edge, said form removably mounted upon said rack to support the form, and a tank of liquid latex into which said rack is movable to dip said form into said latex.

9. That method for making dipped rubber articles comprising providing a form with an abrupt lower edge for defining an opening in the article, dipping the form one or more times in a body of liquid latex or the like, removing the form from the latex at each dipping at a relatively fast rate until said lower edge closely approaches the surface of the latex, and then decelerating the speed of the form just before withdrawal of said lower edge.

10. That method for making dipped rubber articles comprising providing a form with an abrupt lower edge for defining an opening in the article, dipping the form one or more times in a body of liquid latex or the like, removing the form from the latex at each dipping at a relatively fast rate until said lower edge closely approaches the surface of the latex, then stopping the form just before withdrawal of said lower edge, and finally removing the form from the latex at a relatively slow rate of speed.

11. That method for making dipped rubber articles comprising providing a form with an abrupt lower edge for defining an opening in the article, dipping the form one or more times in a body of liquid latex or the like, withdrawing the form from the latex at each dipping until said lower edge closely approaches the surface of the latex, then stopping the form just before withdrawal of said lower edge, and finally removing the form from the latex.

12. That method for making dipped rubber articles comprising providing a form with an abrupt lower edge for defining an opening in the article, dipping the form one or more times in a body of liquid latex or the like, removing the form from the latex at each dipping until said lower edge closely approaches the surface of the latex and decelerating the speed of the form just before withdrawal of said lower edge.

13. That method for making dipped rubber articles comprising providing a form with an abrupt lower edge for defining an opening in the article, dipping the form one or more times in a body of liquid latex or the like, removing the form from the latex at each dipping until said lower edge closely approaches the surface of the latex, then stopping the form just before withdrawal of said lower edge, and finally removing the form from the latex at a relatively slow rate of speed.

ABRAHAM N. SPANEL.
ROGER D. WESTON.
WALTER BITNER.